United States Patent
Kaiker et al.

(12)

(10) Patent No.: US 6,273,461 B1
(45) Date of Patent: Aug. 14, 2001

(54) VEHICLE SAFETY AIRBAG CONTROL SYSTEM

(75) Inventors: Patricia S Kaiker, West Bloomfield; Michele K Harbaugh, Shelby Twp.; James S Stouppe, Ann Arbor, all of MI (US)

(73) Assignee: DaimlerChrysler Corporation, Auburn Hills, MI (US)

( * ) Notice: Subject to any disclaimer, the term of this patent is extended or adjusted under 35 U.S.C. 154(b) by 0 days.

(21) Appl. No.: 09/641,829

(22) Filed: Aug. 18, 2000

Related U.S. Application Data

(63) Continuation-in-part of application No. 09/395,679, filed on Sep. 13, 1999, now abandoned.

(51) Int. Cl.⁷ .................................................. B60R 21/32
(52) U.S. Cl. ............................................ 280/735; 280/732
(58) Field of Search ..................................... 280/735, 731, 280/732

(56) References Cited

U.S. PATENT DOCUMENTS

| | | | |
|---|---|---|---|
| 5,330,226 | * | 7/1994 | Gentry et al. .......................... 280/735 |
| 5,549,323 | * | 8/1996 | Davis .................................. 280/728.3 |
| 5,588,673 | * | 12/1996 | Green et al. ........................... 280/731 |
| 5,722,686 | * | 3/1998 | Blackburn et al. .................... 280/735 |
| 5,961,144 | * | 10/1999 | Desmarais ............................. 280/731 |
| 5,964,478 | * | 12/1999 | Stanley et al. ........................ 280/735 |

* cited by examiner

*Primary Examiner*—Kenneth R. Rice
(74) *Attorney, Agent, or Firm*—Mark P. Calcaterra

(57) ABSTRACT

Deployment of a vehicle airbag can be prevented in situations where the vehicle occupant has a hand, or other body part, in direct physical contact with the airbag cover. This can be achieved by a membrane switch or capacitive touch membrane incorporated into the outer exposed surface of the airbag cover.

4 Claims, 2 Drawing Sheets

VEHICLE SAFETY AIRBAG CONTROL SYSTEM

CROSS REFERENCE TO A RELATED PATENT APPLICATION

This is a continuation-in-part of U.S. patent application Ser. No. 09/395,679 filed on Sep. 13, 1999, now abandoned.

BACKGROUND OF THE INVENTION

This invention relates to a vehicle safety airbag control system, and particularly to a control system that, during a crash event, prevents airbag deployment if the vehicle seat occupant has direct physical contact with the vehicle dashboard containing the stored airbag at the beginning of the crash event.

DESCRIPTION OF PRIOR DEVELOPMENTS

There are already in existence various systems for controlling the deployment of safety airbags in automotive vehicles.

U.S. Pat. No. 5,549,323, to D. J. Davis discloses a system for preventing the deployment of an automotive airbag when the associated seat is unoccupied or occupied by an infant. The system includes a sensor located in an airbag cover for sensing the absence of an adult person in the vehicle seat. The sensor can be an ultrasonic sensor, electromagnetic sensor, an optical sensor, or an infrared sensor.

U.S. Pat. No. 5,722,686, to B. Blackburn et al, discloses a vehicle airbag system that includes a capacitor circuit means in the vehicle steering wheel for controlling the activation of a safety airbag. The capacitor circuit means is designed so that if the driver of the vehicle should be undesirably close to the steering wheel, the capacitance of the circuit is increased to a value that will prevent actuation of the airbag.

U.S. Pat. No. 5,330,226, to S. Gentry et al, discloses a vehicle airbag control system that includes an infrared sensor that controls airbag actuation inversely according to the spacing between the seat occupant and the airbag location.

U.S. Pat. No. 5,588,673, to M. Green et al, discloses a membrane switch located on an automotive steering wheel for controlling an audible horn. The switch includes two opposed flexible dielectric sheets having conductive metallic layers on their opposed surfaces, whereby manual pressure on one of the sheets completes an electric circuit across the metallic layers.

SUMMARY OF THE INVENTION

The present invention relates to a vehicle safety airbag deployment control system, wherein a membrane in the airbag cover is an active part of the control system, so that when a vehicle occupant is touching the membrane during the initiation of a crash event, the control systems prevents (or delays) airbag deployment for that entire event, even if the occupant subsequently breaks contact with the membrane. However, if an occupant touches and releases the membrane during normal driving conditions, i.e., a non-crash event, the airbag controller is immediately enabled to fire in the event of a crash.

The membrane could be part of a touch-responsive switch or part of a capacitive control circuit responsive to human contact with the membrane. This switch provides one of many input signals to an airbag controller for making a decision as to whether an airbag should be deployed.

Particular features of the invention will be apparent from the attached drawings and description of an illustrative embodiment of the invention.

DESCRIPTION OF A PREFERRED EMBODIMENT OF THE INVENTION

Figure 1:
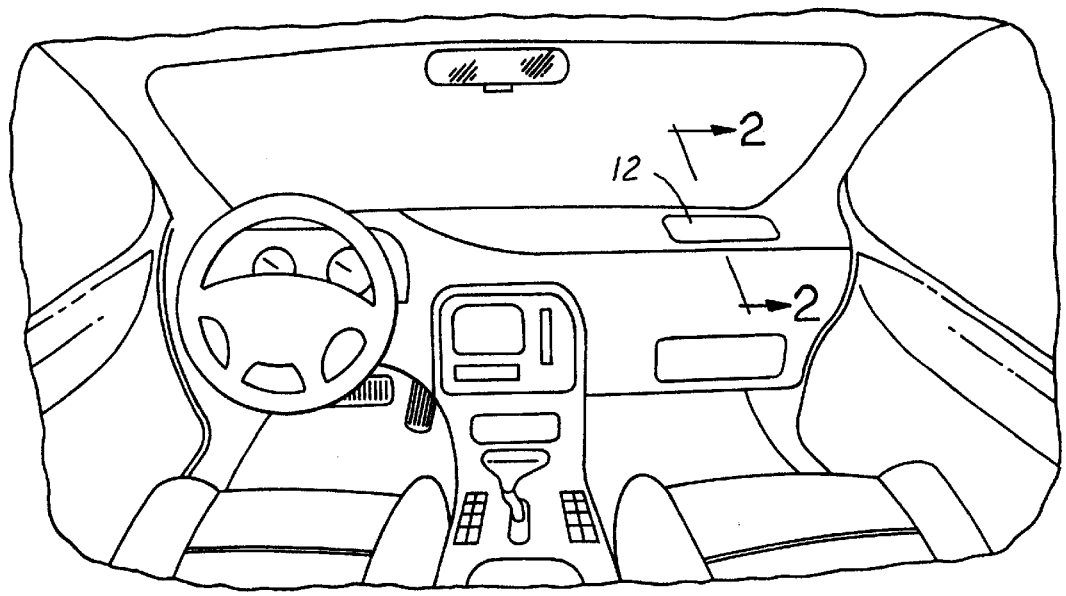
FIG. 1 shows the interior of an automotive vehicle having a passenger side airbag that can be controlled by a mechanism according to the present invention.
Figure 2:
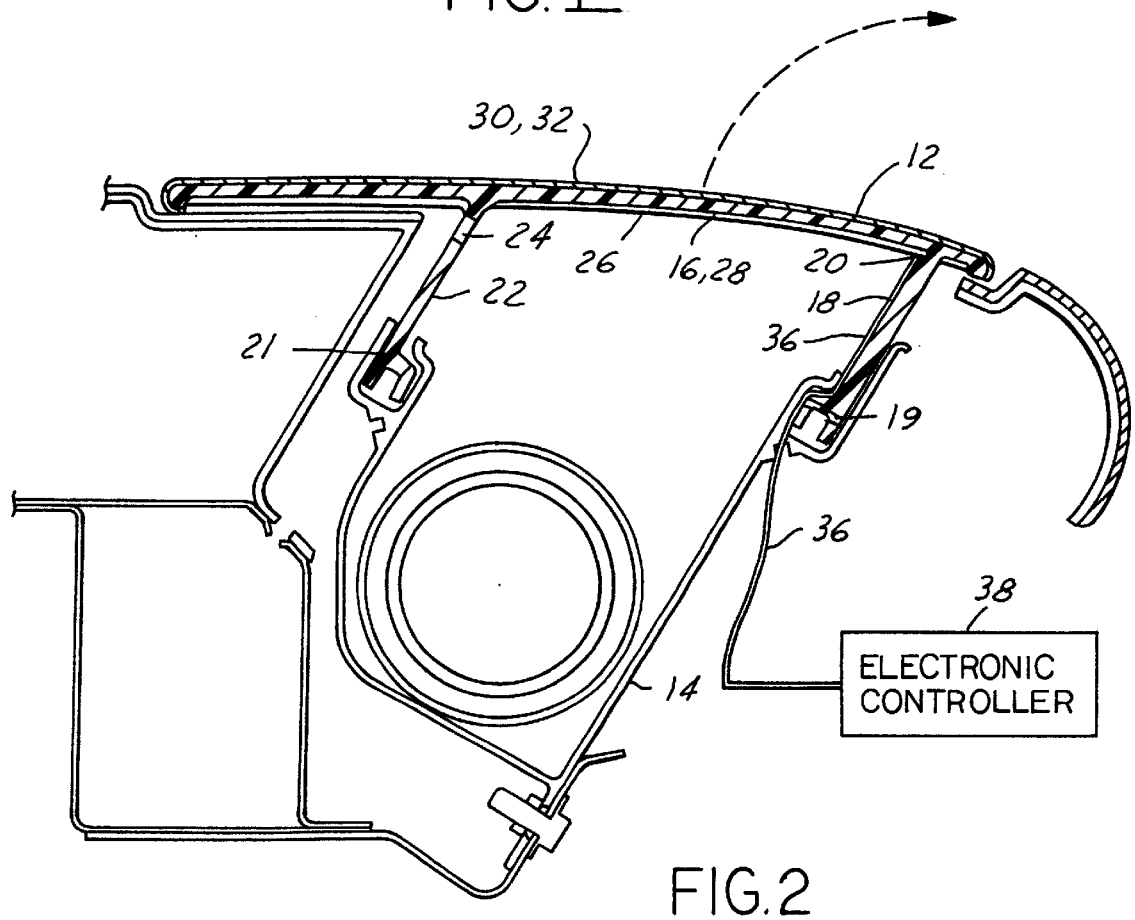
FIG. 2 is an enlarged transverse sectional view taken on line 2—2 in FIG. 1.

FIGS. 1 and 2 show an automotive vehicle having an instrument panel dashboard equipped with a safety airbag cover 12. An airbag canister 14 is located within the instrument panel, so that when a crash sensor is actuated, the airbag is expanded from the canister against the interior surface of the airbag cover.

The airbag cover includes a rigid cover member 16 overlying the airbag escape path. The rigid cover member having an interior plate 18 anchored at 19 to one wall of the airbag canister, so that the cover can swing outwardly around a hinge axis 20 located at the juncture between member 16 and plate 18.

Cover member 16 is connected to a second plate 22 that is anchored at 21 to another wall of the airbag canister. Near the juncture between cover member 16 and plate 22 the plate has a row of perforations 24 extending normal to the plane of the paper (in FIG. 2). These perforations weaken plate 22, so that when the inflated airbag presses against cover member 16, the portions of plate 16 between perforations 24 are broken to enable the airbag to swing the airbag cover outwardly around hinge axis 20. The internally pressurized airbag expands into the passenger compartment to provide a forward cushion for the front seat passenger.

Typically, airbag deployment is relatively rapid, e.g., in about twenty-five milliseconds. Should a person have a hand, foot or other body part in contact with airbag cover 12 at the moment of airbag deployment, the person could be hit by the cover swinging outwardly around hinge axis 20. The present invention contemplates an airbag deployment control system that prevents airbag deployment if an occupant is in contact with cover 12 at the instant an airbag controller receives a signal of a crash event occurring.

In the system depicted in FIG. 2, a membrane switch is employed on the exposed surface of the airbag cover to prevent airbag deployment while any part of a person's body is in pressure contact with the exposed cover surface. In the system depicted in FIG. 5, a touch-responsive membrane is provided on the exposed surface of the airbag cover to delay airbag deployment. The membrane forms part of a capacitive control circuit. In both cases, airbag deployment is accomplished when the person is out of contact with the airbag cover and a crash event has occurred at a time when the occupant has not disabled the firing system by being in contact with the airbag cover.

Figure 3:
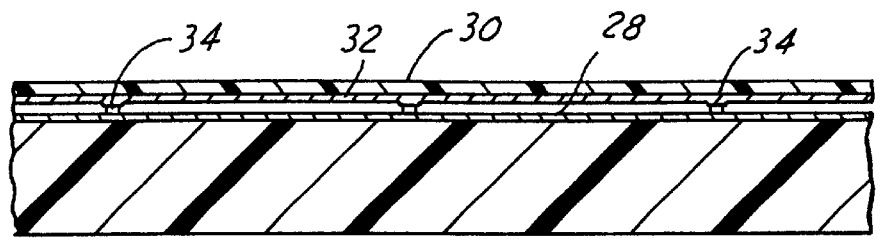
FIG. 3 is a fragmentary sectional view of a membrane switch embodied in an airbag cover in the FIG. 2 mechanism.

Referring to FIGS. 2 and 3, the airbag cover includes a relatively rigid cover member 16 having reinforcing ribs 26 on its back interior face. The outer exterior face of cover member 16 has an electroplated metallic film 28 thereon. Typically the metallic film is copper or silver covering substantially the entire outer surface of cover member 16.

A thin flexible covering 30 of a dielectric material overlies the entire outer surface of member 16. Covering 30 may be a woven cloth or non-woven plastic sheet having a thickness of about 0.004 inch. Covering 30 is secured to rigid member 16 only along the peripheral edge of member 16, leaving the major facial area of covering 30 free for flexural movement, e.g. when a person exerts a slight body pressure on the covering.

Covering 30 has a thin flexible metallic film 32 on its entire interior surface. As shown in FIG. 3, metallic film 32 is normally spaced a slight distance from the metallic film 28 by an egg crate type dielectric spacer sheet 34 bonded to the outer surface of film 28. Typically, spacer sheet 34 has a thickness of about 0.010 inch, sufficient to prevent current flow across the two metallic films 28 and 32.

The two metallic films 28 and 32 form electrical contacts which extend substantially coextensively with the exposed surface of airbag cover 12. Edge areas of metallic films 28 and 32 are bonded with lead wiring 36 (FIG. 2) that extends along plate 18 for eventual connection with an airbag deployment control circuit or controller 38.

Circuit 38 may include a relay that can be energized by closure of a circuit across contacts 28 and 32, such that the relay contacts are opened to prevent airbag deployment even though the crash sensor controller otherwise calls for such deployment.

Membrane contacts 28 and 32 are closed by slight pressure of a person's hand or other body part on flexible covering 30. Typically, the required pressure is one half pound or less, applied at any location on the exposed surface of the airbag cover 12. Whenever a person releases or disengages from the covering 30 during normal driving conditions, the flexible contact 32 disengages from contact 28, to allow airbag deployment provided a crash event is not in progress. If a crash is in progress, the airbag will not deploy if a person was in contact with the cover at the initiation of the crash and breaks contact with the cover any time after the initiation of the crash.

The membrane switch depicted in FIG. 3 serves as a control for preventing airbag deployment as long as the vehicle occupant is in physical contact with outer covering 30 during normal driving conditions, or during the initiation of a crash event (even if subsequent contact is broken after initiation of the crash event).

Figure 4:
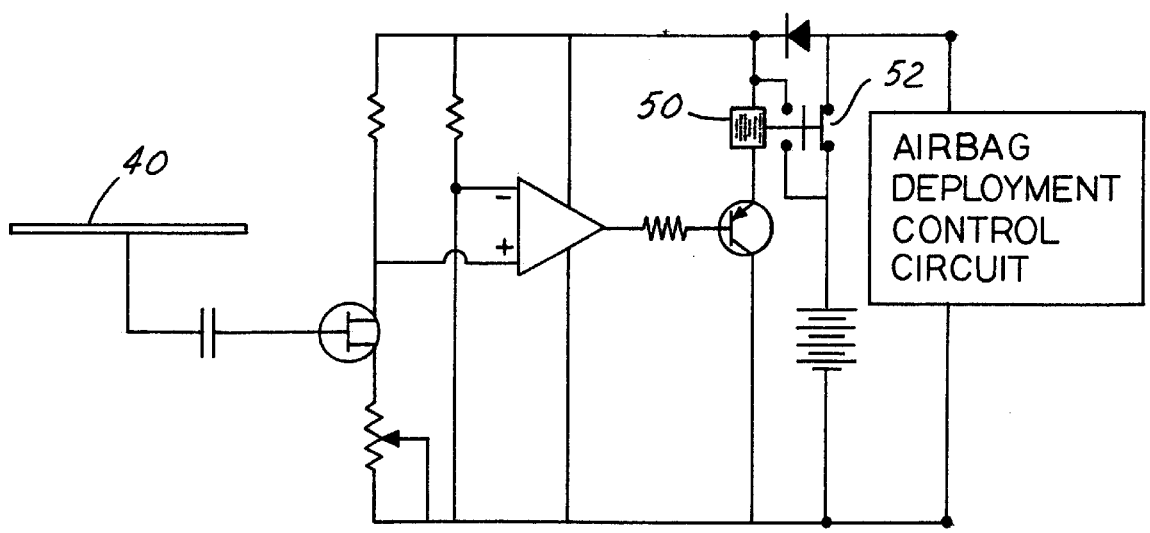
FIG. 4 is a capacitive control circuit that can be employed in practice of the invention.
Figure 5:
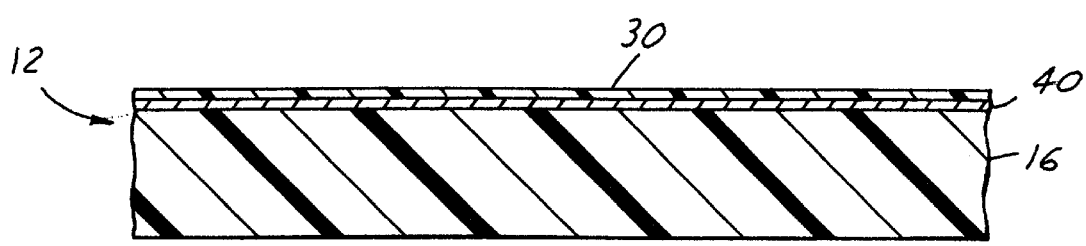
FIG. 5 is a fragmentary sectional view taken in the same direction as FIG. 3, but showing a mechanism that utilizes the capacitive circuit of FIG. 4.

FIGS. 4 and 5 depict an alternate airbag deployment control system wherein a capacitive circuit is used to operate the relay that delays airbag deployment. As shown in FIG. 4, the circuit includes a metallic touch membrane 40 connected to a capacitance that is in circuit with a field effect transistor. The signal generated by the FET transistor is amplified and applied to a transistor that controls a relay 50. The relay contacts 52 are employed to delay airbag deployment as long as the vehicle occupant has physical contact with metallic membrane 40.

FIG. 5 shows metallic membrane 40 as a metallic layer located on rigid cover member 16 underneath outer covering 30. Membrane 40 has an area that is coextensive with the exterior surface of cover member 16, such that when the vehicle occupant touches any area of covering 30 the person's body becomes a capacitive part of the FIG. 4 control circuit. A weak signal transmitted through the capacitance is applied to the FET transistor, which generates the desired control action.

The drawings show two particular forms that the invention can take. Some variations in construction is possible while still practicing the invention. A principal aim of the invention is to incorporate into an airbag cover a circuit for preventing airbag deployment as long as the vehicle occupant has any direct physical contact with an exposed surface area of the airbag cover at the initiation of a crash event.

What is claimed:

1. A control system for a vehicle airbag deployment mechanism, comprising:

an electrical circuit for normally triggering the airbag deployment mechanism to inflate the airbag in a crash event;

an airbag cover; and means responsive to direct vehicle occupant contact with an exposed surface of said cover for generating a control signal that prevents said electrical circuit from triggering the airbag deployment mechanism;

said signal generating means being effective only while there is direct occupant contact with said airbag cover, whereby said electrical circuit is enabled to instantaneously trigger the airbag deployment mechanism to the deployed state after the vehicle occupant is out of direct physical contact with the airbag cover.

2. The control system of claim 1, wherein said signal generating means includes a capacitive circuit means responsive to direct physical contact with an exposed surface of the airbag cover.

3. The control system of claim 2, wherein said capacitive circuit means includes a touch-responsive membrane on said cover and a capacitance electrically connected to said membrane, whereby a person in electrical contact with said membrane becomes part of a capacitive control circuit for the signal generating means.

4. The control system of claim 3, wherein said touch-responsive membrane is coextensive with the exposed surface of the airbag cover.

* * * * *